United States Patent [19]
Mosby

[11] Patent Number: 6,032,481
[45] Date of Patent: Mar. 7, 2000

[54] THERMOREGULATING CONTAINER

[76] Inventor: Sharon D. Mosby, 4418 Lynn La. #76, North Little Rock, Ark.

[21] Appl. No.: 09/135,799

[22] Filed: Aug. 18, 1998

Related U.S. Application Data

[60] Provisional application No. 60/056,408, Aug. 26, 1997.

[51] Int. Cl.$^7$ ........................................ F25D 3/08
[52] U.S. Cl. .................. 62/457.2; 62/457.3; 62/463; 62/460; 165/74
[58] Field of Search ............... 62/457.2, 457.3, 62/463, 460; 165/74

[56] References Cited

U.S. PATENT DOCUMENTS

| | | |
|---|---|---|
| 2,991,628 | 7/1961 | Tuck . |
| 3,310,953 | 3/1967 | Rait . |
| 4,320,626 | 3/1982 | Donnelly . |
| 4,981,019 | 1/1991 | Hicks et al. . |
| 5,042,258 | 8/1991 | Sundhar . |
| 5,060,479 | 10/1991 | Carmi et al. . |
| 5,301,508 | 4/1994 | Kahl et al. . |

FOREIGN PATENT DOCUMENTS

| | | |
|---|---|---|
| 2501349 | 9/1982 | France . |
| 4028658 | 3/1991 | Germany . |
| 2169693 | 7/1986 | United Kingdom . |

*Primary Examiner*—Henry Bennett
*Assistant Examiner*—Mark Shulman
*Attorney, Agent, or Firm*—Richard C. Litman

[57] ABSTRACT

A thermoregulating container provides for the heating and cooling of food and drink. The container is insulated and includes a heat exchanger system that can maintain the temperature of the contents of the container. The device may include modular elements that can detachably attach to one or many containers to selectively heat or cool the contents of the container(s). A first embodiment container includes at least one passage through the walls thereof, for conducting a heat exchanging fluid (water, refrigerant liquid, etc.) therethrough. The container passage(s) communicate with an attached reservoir module when such a module is attached to the container. When the module is attached, a heat exchanging fluid is circulated through the passage(s) in the container walls to heat or cool the substance therein accordingly. A second embodiment includes heating and cooling modules which are selectively attachable to the container, and serve to heat or cool the contents of the container through a relatively thin heat conductive plate disposed between the attached module and the interior of the container. The various modular elements of the present thermoregulating container permit purchase of individual elements as desired, with a person perhaps initially purchasing only the container, and later adding a cooling and/or heating element as desired, in order to spread the cost over a period of time. An insulating component, which in and of itself contains no heating or cooling means, may also be provided for selective attachment to the container, as desired.

20 Claims, 4 Drawing Sheets

THERMOREGULATING CONTAINER

REFERENCE TO RELATED PATENT APPLICATION

This application claims the benefit of U.S. Provisional Patent Application Ser. No. 60/056,408, filed on Aug. 26, 1997.

BACKGROUND OF THE INVENTION

1. Field of the Invention

The present invention relates generally to devices for heating and/or cooling a substance, and more particularly to a portable container for heating or cooling the contents thereof. The present invention includes a first embodiment container having fluid channels in the walls thereof, and providing for the circulation of a relatively warmer or cooler fluid therethrough, respectively for heating or cooling the contents of the container. A reservoir container containing a relatively warmer or colder fluid is secured to the main container, and the fluid is circulated through the walls of the main container to heat or cool the contents thereof. A second embodiment includes heating and cooling modules selectively attachable to the container, for selectively heating and cooling the contents of the container through a thin, thermally conductive wall disposed between the module and the container.

2. Description of the Related Art

The need or desire to heat or cool a substance, particularly a beverage, has been recognized for a considerable time. Accordingly, various devices have been developed in the past for heating substances, and more recently for cooling various substances. Most such devices are relatively bulky (refrigeration units, stoves, etc.), and are not well adapted for use in heating or cooling a relatively small quantity of material, such as a single serving of a drink or the like.

Moreover, such devices as known in the prior art are generally relatively specialized, and are not capable of serving as either a heating or cooling device in the same apparatus. Accordingly, a need is seen for a cooling and heating container that utilizes a minimum of components to improve reliability, reduce its size, weight and cost of production, and ultimately make the end product more affordable to the general public. The device may make use of a universal container having at least one continuous thermal passage in the walls thereof for containing the beverage or other substance to be heated or cooled, and various accessories which may be selectively attached to the container to communicate with the thermal passage of the container. A second embodiment may include selectively attachable heating or cooling modules. A user of the device may install either a heating or cooling unit to the container, or a heat sink device as desired, in order to heat, cool, or maintain the temperature of the substance within the container. The various components should be capable of being secured together for storage, as desired. A discussion of the related art of which the present inventor is aware, and its differences and distinctions from the present invention, is provided below.

U.S. Pat. No. 2,991,628 issued on Jul. 11, 1961 to Harvey R. Tuck, titled "Refrigerating Apparatus," describes a device for cooling a relatively small, single container. The device includes a complex electrical circuit and selectively heats or cools the container by means of a plurality of thermocouples. Tuck describes the walls of the device as comprising a plastic foam material including a heat exchanging fluid cast therein, but does not describe any means of circulating the fluid through the walls, due to the foam plastic material used. In contrast, at least one embodiment of the present invention includes at least one fluid circulation passage within the walls of the container and means for the fluid to communicate between the heating or cooling units and the container, with another embodiment including interchangeable heating and cooling units removably attachable to the base of the container, none of which is disclosed by Tuck.

U.S. Pat. No. 3,310,953 issued on Mar. 28, 1967 to Joseph M. Rait, titled "Portable Refrigerator For Beverage Containers And The Like," describes a device having a thermoelectric array using the Peltier effect to heat and cool the device when electrical current is passed therethrough. The device is intended for heating or cooling a relatively large quantity of a beverage, as indicated by FIG. 2 and discussed in column 2, lines 46 through 49. No circulation system for passing heated or cooled fluid through the walls of the container is disclosed by Rait, nor is any interchangeable heating or cooling unit disclosed, which features are a part of the present invention.

U.S. Pat. No. 4,320,626 issued on Mar. 23, 1982 to Joseph H. Donnelly, titled "Portable Beverage Chiller/Warmer," describe an insert for a relatively large beverage container, for heating or cooling the beverage within the container. The device utilizes a plurality of thermoelectric devices and the Peltier effect, to heat or cool the insert. While the container has double walls and an insulating space therebetween, Donnelly does not disclose the use of a heat exchange medium (refrigerant or coolant fluid, etc.) circulating within the walls of the container, as provided by at least one embodiment of the present invention.

U.S. Pat. No. 4,981,019 issued on Jan. 1, 1991 to Carole L. Hicks et al., titled "Solar Powered Portable Food Container," describes a device using a thermoelectric array to selectively heat or cool the interior of a container, and a photoelectric cell array and electrical storage battery for electrical power. Hicks et al. do not disclose any selectively attachable and removable heating or cooling units, nor are any passages provided in the walls of the container, as provided in the present invention.

U.S. Pat. No. 5,042,258 issued on Aug. 27, 1991 to Shaam P. Sundhar, titled "Drinking Container," describes an individual drink container including a thermoelectric chip therein. Reversal of electrical current through the chip results in the heating or cooling of the chip, and thermally conductive materials in contact therewith, as desired. As in the other devices discussed above, no means of circulating a heating or cooling fluid through the walls of the container is disclosed, nor is any means of selectively attaching or removing a separable heating or cooling unit, which features form parts of the present invention.

U.S. Pat. No. 5,060,479 issued on Oct. 29, 1991 to Amatzia Carmi et al., titled "Thermoelectric Device For Heating Or Cooling Food And Drink Containers," describes a device using thermoelectric means for heating and cooling a chamber into which a container may be removably placed. No heat exchange channels disposed within the walls of the container are disclosed by Carmi et al., nor is any means of removably and selectively affixing either a heating or a cooling device to the container, disclosed by Carmi et al.

U.S. Pat. No. 5,301,508 issued on Apr. 12, 1994 to W. Henry Kahl et al., titled "Thermoelectric Portable Container," describes a rectangular chest having an electrically powered heating and cooling unit removably attached thereto. The specific principle of operation of the heating and cooling unit, is not disclosed by Kahl et al. This "thermoelectric power module" is recessed into the container, thereby taking up valuable space that could otherwise be used to store food or beverages. The container is double walled and the walls ". . . may be . . . filled with any suitable insulation material . . ." (column 4, lines 28–29). However, no channels for conducting a heat exchanging fluid through the walls, are provided in the Kahl et al. container, as provided in the present invention. Moreover, at least one embodiment of the present thermoregulating container provides a separate reservoir module which fluidly communicates with the passages in the walls of the present container, unlike the Kahl et al. device. The Kahl et al. container is also much larger and bulkier than the present individual serving container.

French Patent Publication No. 2,501,349 published on Sep. 10, 1982 to Rene Grandi et al. describes a portable refrigerator that uses a Peltier effect thermal element. The device has two compartments, with one larger than the other, and a lid having variable thickness. The lid may be placed with the thicker portion contacting the partition between the two compartments to separate them, or may be turned around with the thinner portion across the partition, to allow the two compartments to communicate with one another. The Peltier effect thermoelectric device provides only for cooling one (or both) chambers, with heat escaping through the lid to the ambient atmosphere. No heating and cooling channels disposed within the walls of the device, nor removable and interchangeable heating and cooling elements, are apparent in the French Patent Publication, which features are provided for in the present invention.

British Patent Publication 2,169,693 published on Jul. 16, 1986 to Qun-Min Lu, titled "A Drink Cooler," describes a refrigeration unit having a relatively small liquid container permanently installed in the top thereof. Cooling coils are disclosed within the walls of the refrigeration unit which cradles the liquid container. However, the coolant coils are permanently connected with the refrigeration system of the device, and cannot be removed with the container, as provided in the present invention.

Finally, German Patent Publication No. 4,028,658 published on Mar. 14, 1991 to Werner Cox describes a thermally insulated box for retaining the temperature of comestibles. The container uses a Peltier effect thermoelectric device, as in most of the devices of the prior art discussed further above. No channels for conducting a heat exchange fluid through the walls of the container are disclosed, nor is any means for separating the cooling apparatus from the container disclosed, both of which features are provided in the present thermoregulating container.

None of the above noted inventions and patents, taken either singly or in combination, is seen to describe the instant invention as claimed.

SUMMARY OF THE INVENTION

The present invention comprises a thermoregulating container having an insulated main container and a heat exchanger system for cooling or heating the contents of the container. A first embodiment of the device comprises a main container having at least one heat exchanger fluid passage formed within the walls thereof, and a reservoir module selectively attachable to the main container. The reservoir module contains a heat exchanger fluid which is circulated through the passage in the walls of the main container, to heat or cool the contents thereof as desired. The fluid may be manually or electrically circulated through the walls of the container for heating or cooling the contents thereof, as desired. A second embodiment of the device may include modular elements which are selectively removable and attachable to one or many containers for selectively heating or cooling the contents of each container, by means of a thin, thermally conductive wall disposed between the heating or cooling module and the interior of the container. The modular nature of the present invention allows individual components to be purchased as desired, with a person perhaps initially purchasing a container, and later purchasing a separate cooling or heating module therefor, as desired. The container and various modules may be assembled together for storage as desired.

Accordingly, it is a principal object of the present invention to provide a heating and cooling container device which effectively heats or cools the contents of the container.

Another of the objects of the present invention is to provide a heat transfer circulation system that can cool or heat the contents of the container.

Yet another of the objects of the present invention is to provide a modular system of heating and/or cooling elements which may be detachably attached to the container, permitting the consecutive heating or cooling of more than one container.

Still another of the objects of the present invention is to provide a heating and cooling container device which is economical to produce.

A further object of the present invention is to provide a heating and cooling container device with completely insulated outer walls, and including means for circulating a heat exchanging fluid therethrough.

An additional object of the present invention is to provide a heating and cooling container device in which the detachable elements can be interchangeably locked together.

These and other objects of the invention will become apparent as the nature of the invention is more fully described, illustrated and claimed with reference being made to the attached drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a modularized heating and cooling or thermoregulating container. The device has an insulated main container and a detachable heat exchanger system that can cool or heat the contents of the main container, as desired. The device may include modular elements that can detachably attach to one or many containers to selectively heat or cool the contents of any one of the containers.

Embodiments of the various aspects of the present invention will now be explained with reference to the accompanying drawings. By way of illustration and not limitation, FIGS. 1 to 4 are presented to show the preferred embodiments of the invention.

Figure 1:
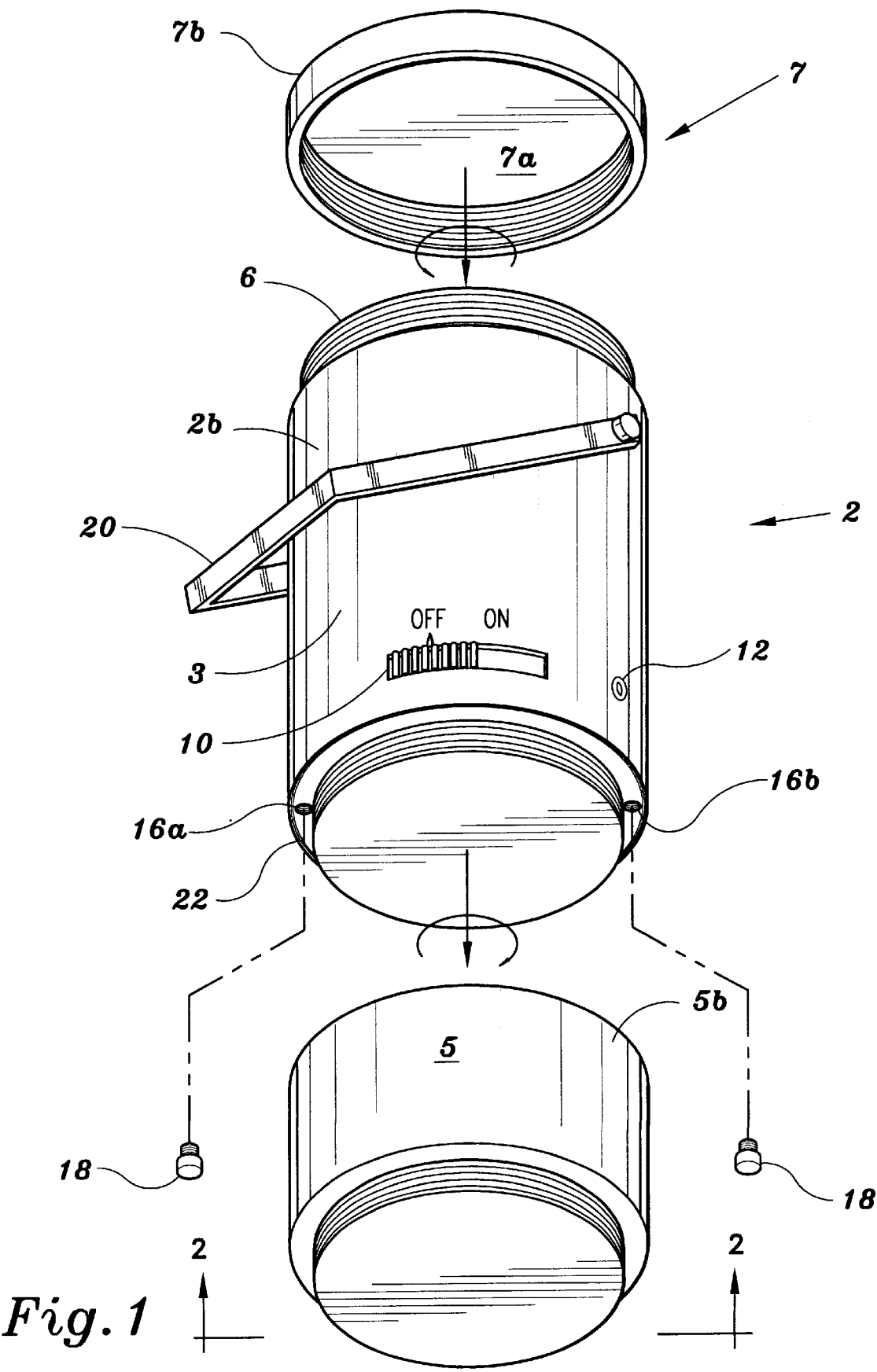
FIG. 1 is an exploded perspective view of the first embodiment of the heating and cooling container device, showing its main components in a separated state.
Figure 2:
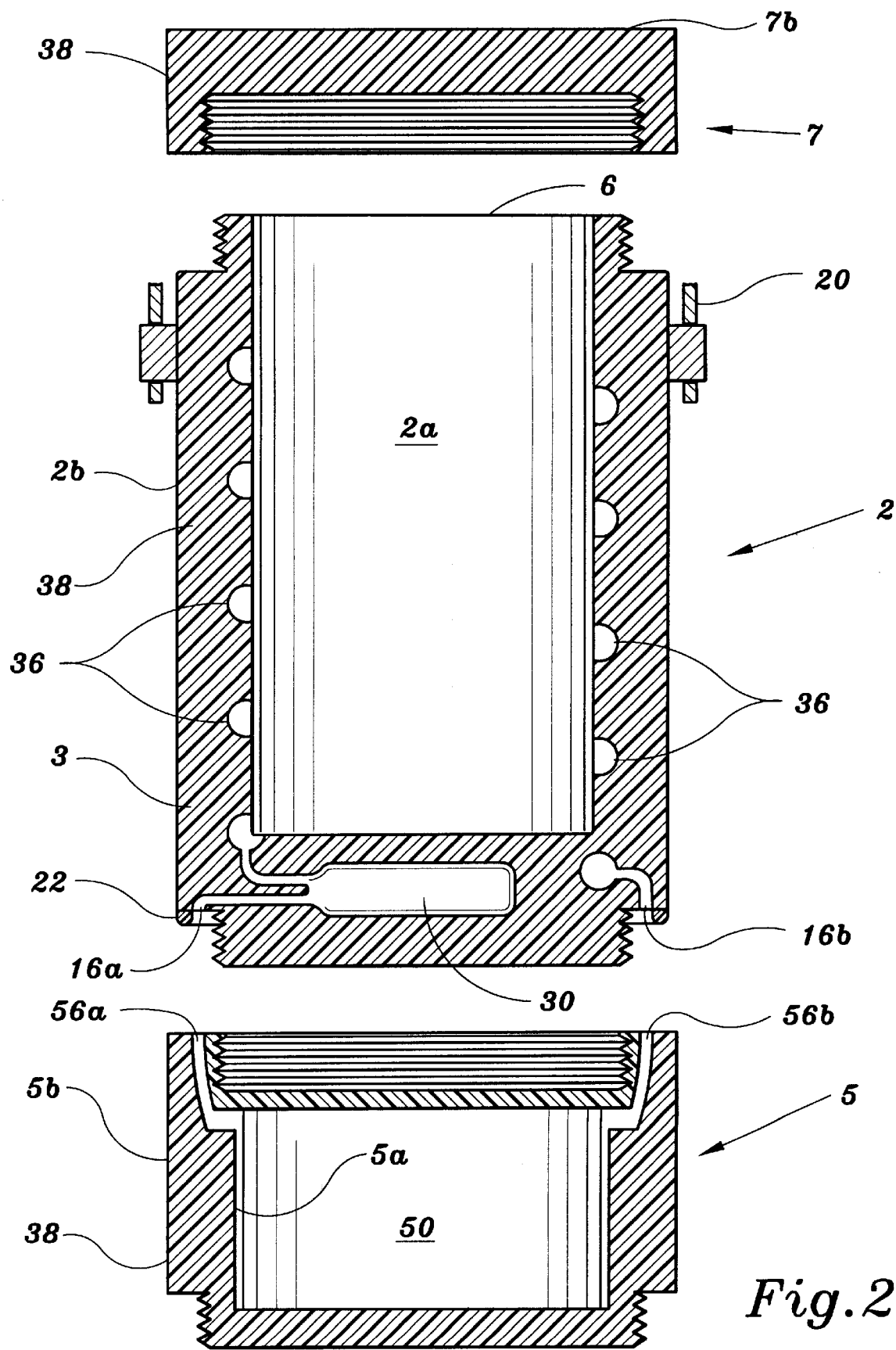
FIG. 2 is an elevation view in section of the container device as shown along lines 2—2 of FIG. 1.

In one preferred embodiment, shown in FIGS. 1 and 2, the heating and cooling device 2, 5, 7 has a main container 2 having walls 3 with an inner surface 2a (FIG. 2), outer surface 2b and an opening 6. It is preferred that the inner surface 2a of the main container 2 has a lining (not shown), that is non-reactive with food and drinks, that covers all the inner surface 2a of the main container 2. It is preferred that there is insulation material 38 between the inner and outer surfaces 2a, 2b of the main container 2, as shown in FIG. 2. It is also preferred that the main container 2 includes a handle 20 to enhance its portability.

A cover 7 having inner and outer surfaces 7a, 7b detachably closes the opening 6 of the main container 2. Preferably, the cover 7 is detachably threaded onto the main container 2 to close the opening 6. It is preferred that the cover 7 has an inner lining (not shown) and that the lining is non-reactive with food and drinks. It is also preferred that there is insulation material 38 between the inner and outer surfaces 7a, 7b of the cover 7. In addition, it is preferred that a flexible seal (not shown, but essentially identical to the lower seal 22, discussed further below) seals the contact area between said main container 2 and the cover 7.

A reservoir container 5 has inner and outer surfaces 5a, 5b. It is preferred that insulation material 38 fills the space between the inner and outer surfaces 5a, 5b. In the embodiment of FIGS. 1 and 2, to operate the device 2, 5, 7, a fluid with good heat transfer characteristics (e.g., a substance such as is used to fill "cold packs" and the like, for keeping foods cool in lunch boxes, cooler chests, etc.) fills the reservoir 50. It is preferred that the reservoir container 5 is detachably mounted, preferably threaded, onto said main container 2. In one embodiment, a flexible seal 22, essentially the same as the seal. used to seal the interface between the cap or cover 7 and the main container 2, seals the contact area between the main container 2 and the reservoir container 5 to prevent leaks of the heat transfer liquid or fluid. Additionally, it is preferred that the reservoir container 5 has a reservoir inlet 56a and reservoir outlet 56b.

In one embodiment, as in FIG. 2, a circulation system in the form of spiral or helical tubing 36 envelopes the inner surface 2A of the main container 2 and lies immediately adjacent thereto, preferably contacting the inner lining (not shown) of the main container 2. The spiral tubing 36 has a main container inlet 16a and a main container outlet 16b through which the liquid enters and exits by means of the respective inlet and outlet 56a and 56b of the reservoir container 5, when the reservoir container 5 is secured to the main container 2. When the circulation system is not utilized, plugs 18 can close the inlets and outlets 16a, 16b, 56a, 56b. A circulation of the liquid around the spiral tubing 36 is facilitated by a pump 30. It is preferred that a conventional electric or manually-powered pump 30 be used to circulate the liquid from the reservoir 50 around the contents of the main container 2 via the spiral tubing 36. An external power source inlet 12 may be used to power the electric pump 30 and the pump 30 may be activated by the control switch 10.

Preferably, separate reservoir containers 5 are used for cooling and heating. It is preferred that the liquid contained in the reservoir tank 50 does not freeze at temperatures typically maintained in a freezer section of a conventional refrigerator, so that the cold fluid can flow freely around the spiral tubing 36. It is preferred that in the cooling mode, a liquid with good anti-freeze characteristics be used. It is preferred that a refrigerated anti-freeze gel be used to cool the contents of the main container 2.

In the heating mode, it is preferred that the reservoir container 5 is made of material that is safe to heat in a microwave so that the liquid in the reservoir container 5 can be heated readily. It is preferred that the device 2, 5, 7 is made from microwave oven-safe material (e.g., a suitable heat resistant plastic). In the heating mode, it is preferred that water be placed in the reservoir container 5 and microwaved, and then circulated around the contents of the main container 2 via the spiral tubing 36.

The reservoir container 5 has a reservoir inlet 56A and a reservoir outlet 56B which detachably connects to the main container inlet 16A and the main outlet 16B, respectively, thus facilitating the flow of liquid out of and back into the reservoir container 5, to transfer heat between the contents of the main container 2 and the circulating liquid. In one embodiment (not shown), the circulating liquid is directly attached to a hot or cold liquid source, such as a faucet, bypassing the reservoir container 5.

One preferred use for this device 2, 5, 7 is to warm baby formula or food in general. It is most unwise to microwave baby food since microwaved food tends to be unevenly heated and/or overheated. Alternatively, liquid (preferably water) in the reservoir container 5 can be heated in the microwave oven and the heated liquid can be circulated inside the main container 2 to heat its contents evenly.

One preferred method of the device 2, 5, 7 is for cooling hot soup prior to refrigeration. To rapidly cool hot soup, the soup should be poured into the main container 2 and the main container inlet 16A should be connected to a cold liquid source, such as a cold tap water faucet or the reservoir 50 containing a refrigerated liquid.

Figure 3:
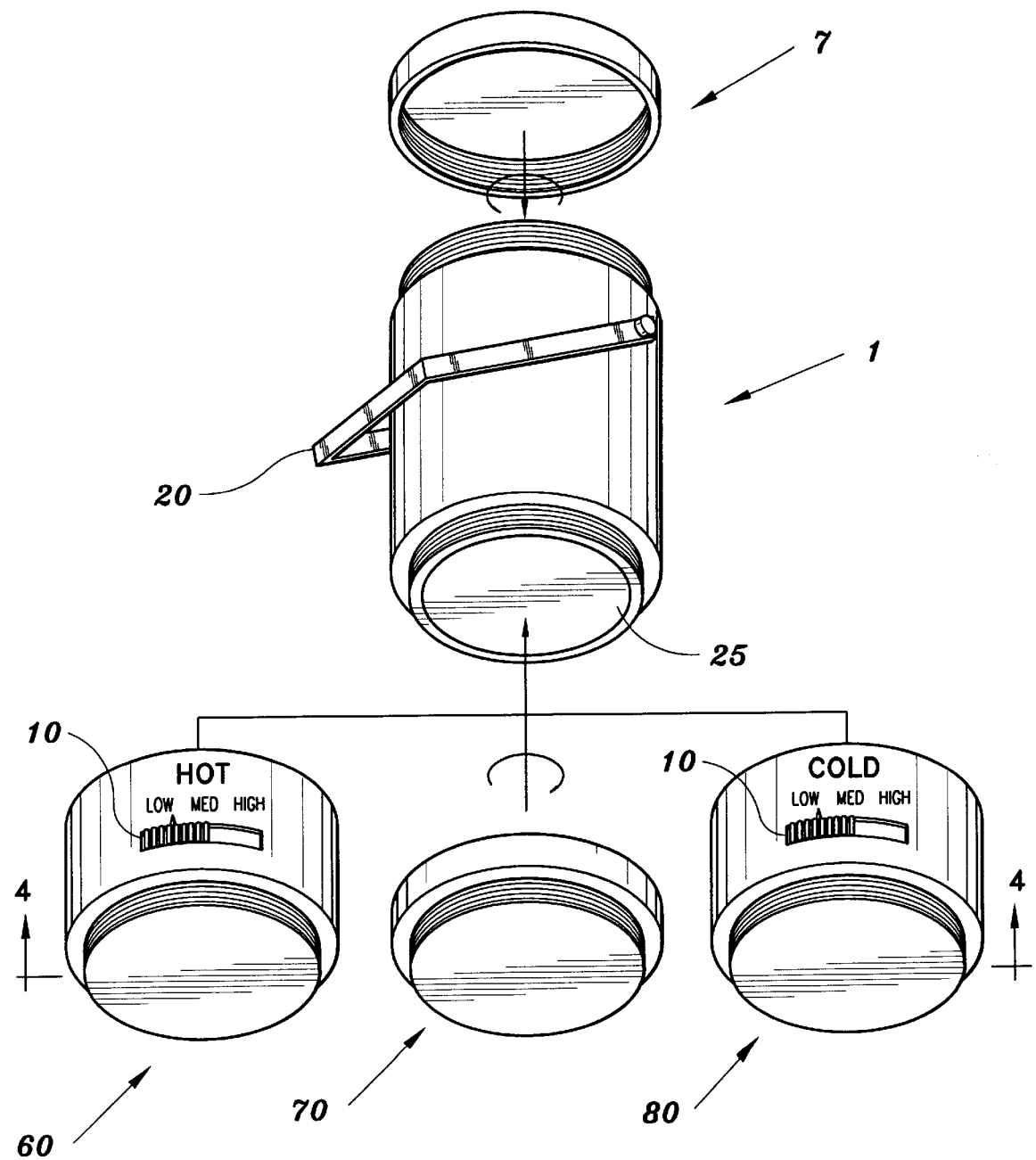
FIG. 3 is an exploded perspective view of another embodiment of the heating and cooling device showing the main container and cover and three modular packs which alternatively attach to the main container.
Figure 4:
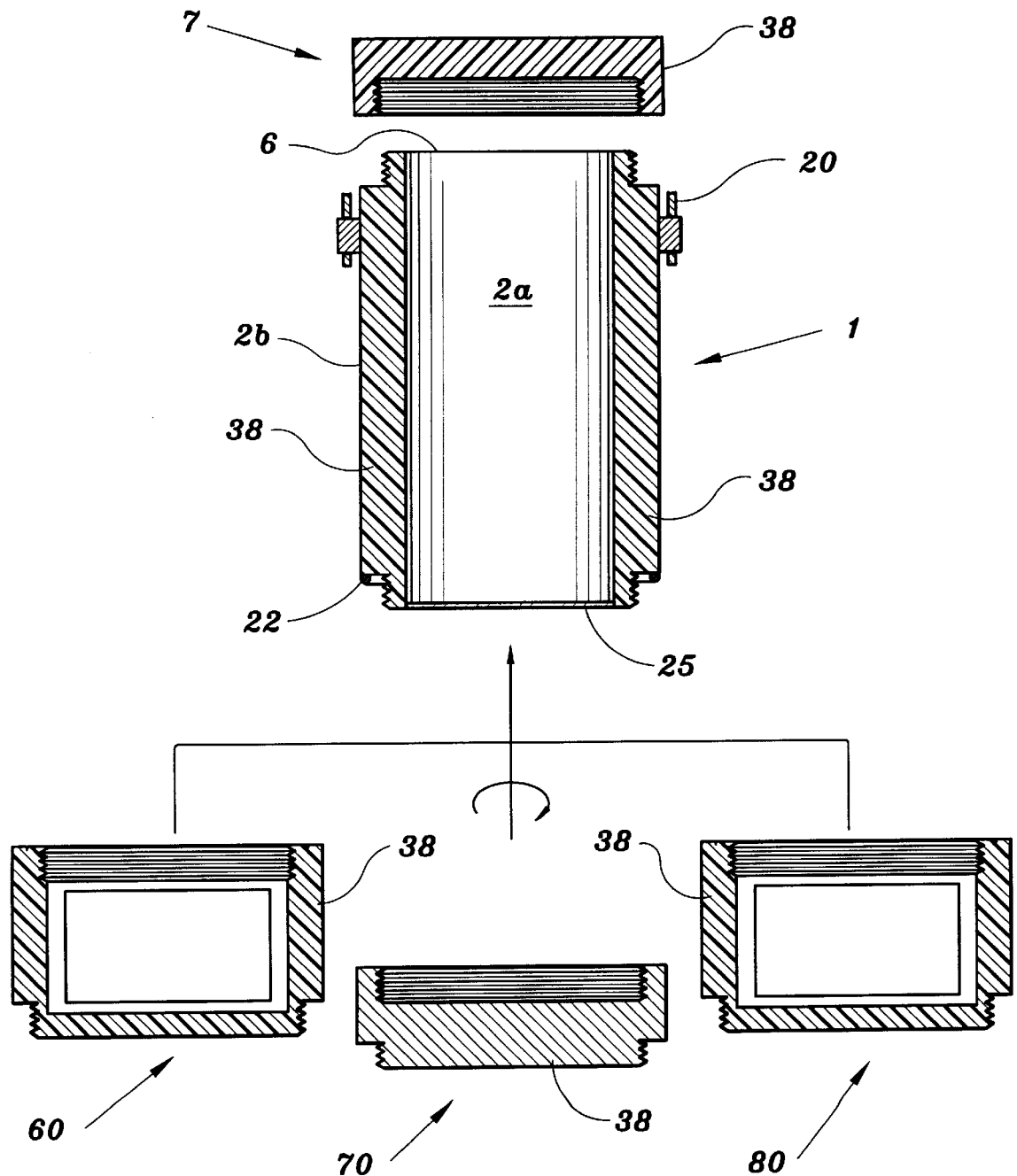
FIG. 4 is an elevation view in section of the container device as shown along lines 4—4 of FIG. 3.

In another embodiment, as in FIGS. 3 and 4, the heat transfer system is via a thin, thermally conductive heat transfer plate 25 of the main container 1. (It will be seen that the container 1 of FIGS. 3 and 4 differs from the container 2 of FIGS. 1 and 2, in that the container 1 does not include an integral pump means or circulation system therein, but relies upon external pump means, as described below. The container 1 is otherwise essentially the same as the container 2 of FIGS. 1 and 2, with the exception of the above mentioned transfer plate 25.) A modularized system is provided comprising at least one main container 1, a cover 7, insulation module 70, and a heating module 60 and cooling module 80. All of the above mentioned components 1, 7, 60, 70, 80 include insulated walls 38. The heating and cooling modules 60, 80 and the insulation module 70 are interchangeably attachable, preferably threaded, onto the main container 2, covering the heat transfer plate 25 when they are installed thereover, as shown in FIG. 4. It is preferred that a flexible seal 22 attached to the main container 1 surrounds the contact area between the main container 1 and either of the modules 60, 70, 80, as well as between the cover 7 and upper edge of the main container 1, as in the container 2.

The insulating cover module 70 detachably attaches to cover the heat transfer plate 25, to maintain the temperature of the contents of the main container 1 when neither of the heating or cooling modules 60, 80 is attached to the main container 1.

In one preferred embodiment, the heating module 60 includes a conventional electrically powered heater to heat the contents of the main container 1. In another embodiment, the cooling module 80 includes a conventional electrically powered refrigeration unit. In either of the heating or cooling modules 60, 80, the control switch 10 activates the modules 60, 80. Energy for the modules 60, 80 may include electricity from the household, automobile direct current, and portable batteries.

The methods of heating and cooling such portable devices are well known to those skilled in the art and are hereinafter incorporated by reference. Patents discussed in the descriptions of related art section of this specification include various well known ways of heating and/or cooling portable container devices. For example, the contents of the container 1 can be heated by a heat module 60 that incorporates an electrical resistor to generate heat.

In one embodiment, the heat transfer plate 25 is ribbed (not shown) to increase its surface area to accelerate the rate of heat transfer between the heating or cooling modules 60, 80 and the container 1. The modularized design is particularly advantageous to cost-conscious customers who can first buy the main container 1, cover 7, and insulation module 70 and use it as an ordinary insulated "ice-box." The consumer can then add the heating module 60, which generally would lack the complexity and expense of the cooling module 80, followed by the cooling module 80. It is preferred that the cooling module 80 has both the capabilities to cool and heat the contents of the container 1.

One advantage of this system of cooling and or heating is that multiple containers 1 can be heated or cooled, one at a time, by the respective modules 60, 70. In addition, for ease of portability, all of the modules 60, 70, 80 and the main container 1 can be detachably attached together (preferably by threading). Additionally, in this embodiment, a handle 20 is attached to the main container 1.

In summary, the present invention in its various embodiments provides an extremely handy modular means of either heating, cooling, or maintaining the temperature of a food, beverage, or other substance contained within the main container thereof. The device in its first embodiment provides a relatively inexpensive means of heating or cooling the interior of the container, while providing separate powered means for heating and cooling in a second embodiment by means of separate modular components. Thus, only a single container need be purchased, with separate heating and cooling elements being selectively attached to the container as desired in order to heat or cool the substance in the container.

It is to be understood that the present invention is not limited to the embodiments described above, but encompasses any and all embodiments within the scope of the following claims.

I claim:

1. A heating and cooling device comprising:
    a main container having an opening, said main container including pump means for circulating said heat exchanging fluid around said main container for selectively heating and cooling contents thereof;
    a cover for detachably sealing said opening of said main container;
    said main container having walls including circulation means disposed therein;
    a reservoir container for detachably mounting to said main container;
    said reservoir container including a fluid therein having thermal transfer properties; and
    said reservoir container including at least one inlet passage and at least one outlet passage communicating with said circulation means of said main container when said reservoir container is secured to said main container, with said thermal transfer fluid of said reservoir container circulating through said circulation means of said main container when said reservoir container is connected to said main container, for selectively heating and cooling contents of said main container.

2. The heating and cooling device as recited in claim 1, wherein said walls of said main container include thermal insulation therein.

3. The heating and cooling device as recited in claim 1, wherein said cover further includes thermal insulation therein and a flexible seal for sealing the contact area between said main container and said cover.

4. The heating and cooling device as recited in claim 1, wherein said thermal transfer fluid remains in a liquid state al temperatures maintained in the freezer section of a conventional refrigerator.

5. The heating and cooling device as recited in claim 1, wherein said reservoir container is formed of microwave safe material.

6. The heating and cooling device as recited in claim 5, wherein said material is plastic.

7. The heating and cooling device as recited in claim 1, wherein said walls of said main container have an inner surface, and said circulation means of said main container comprises tubing helically disposed through said walls of said main container and immediately adjacent said inner surface thereof.

8. The heating and cooling device as recited in claim 1, wherein said pump means is manually powered.

9. The heating and cooling device as recited in claim 1, wherein said pump means is electrically powered.

10. A modular heating and cooling device comprising:
    a main container having an opening and an interior;
    a cover for detachably sealing said opening of said main container;
    a heating module including an electrically powered heater for removably attaching to said main container, for heating contents of said main container;
    a cooling module for selectively removably attaching to said main container, for cooling contents of said main container; and
    said main container including a wall having a thin, thermally conductive transfer plate disposed therein and between said interior of said main container and one said module when one said module is attached to said main container, for transferring heat between said main container and either of said heating module and said cooling module for selectively heating and cooling contents of said main container.

11. The heating and cooling device as recited in claim 10, wherein said wall of said main container is thermally insulated.

12. The heating and cooling device as recited in claim 10, wherein said cover is thermally insulated and includes a flexible seal for sealing contact area between said main container and said cover.

13. The heating and cooling device as recited in claim 10, including an insulation module for removably attaching to said main container and covering said transfer plate of said main container when said insulation module is secured thereto, for maintaining the temperature of contents of said main container.

14. The heating and cooling device as recited in claim 13, wherein said insulation module includes thermal insulating means therein.

15. A heating and cooling device comprising:

a main container having an opening and an interior;

a cover for detachably sealing said opening of said main container;

a heating module for removably attaching to said main container, for heating contents of said main container;

a cooling module including an electrically powered refrigeration unit for selectively removably attaching to said main container, for cooling contents of said main container; and said main container including a wall having a thin, thermally conductive transfer plate disposed therein and between said interior of said main container and one said module when one said module is attached to said main container, for transferring heat between said main container and either of said heating module and said cooling module for selectively heating and cooling contents of said main container.

16. The heating and cooling device as recited in claim 10, wherein said main container includes sealing means disposed between said main container and each said module when either of said heating module and said cooling module is secured thereto.

17. The heating and cooling device as recited in claim 15, wherein said wall of said main container is thermally insulated.

18. The heating and cooling device as recited in claim 15, wherein said cover is thermally insulated and includes a flexible seal for sealing contact area between said main container and said cover.

19. The heating and cooling device as recited in claim 15, including an insulation module for removably attaching to said main container and covering said transfer plate of said main container when said insulation module is secured thereto, for maintaining the temperature of contents of said main container.

20. The heating and cooling device as recited in claim 15, wherein said main container includes sealing means disposed between said main container and each said module when either of said heating module and said cooling module is secured thereto.

* * * * *